(12) United States Patent
McGuire et al.

(10) Patent No.: US 12,297,864 B2
(45) Date of Patent: May 13, 2025

(54) SELF LUBRICATING LINEAR GUIDE BUSHINGS FOR RECIPROCATING CANNING AND BOTTLING MACHINERY

(71) Applicant: Roller Bearing Company of America, Inc., Oxford, CT (US)

(72) Inventors: Jarrod McGuire, Murrieta, CA (US); Ryan Meeks, Huntington Beach, CA (US); Brad Haywood, Laguna Niguel, CA (US); Yishen Gu, San Diego, CA (US)

(73) Assignee: Roller Bearing Company of America, Inc., Oxford, CT (US)

( * ) Notice: Subject to any disclaimer, the term of this patent is extended or adjusted under 35 U.S.C. 154(b) by 93 days.

(21) Appl. No.: 17/881,953

(22) Filed: Aug. 5, 2022

(65) Prior Publication Data

US 2023/0048155 A1 Feb. 16, 2023

Related U.S. Application Data

(60) Provisional application No. 63/232,462, filed on Aug. 12, 2021.

(51) Int. Cl.
*F16C 29/02* (2006.01)
*F16C 3/08* (2006.01)
(Continued)

(52) U.S. Cl.
CPC .............. *F16C 29/02* (2013.01); *F16C 33/08* (2013.01); *F16C 33/205* (2013.01); *F16C 33/28* (2013.01); *B33Y 80/00* (2014.12); *F16C 2208/32* (2013.01)

(58) Field of Classification Search
CPC .. F16C 29/02; F16C 33/08; F16C 33/20–208; F16C 33/28; F16C 2208/32
See application file for complete search history.

(56) References Cited

U.S. PATENT DOCUMENTS 3,523,330 A * 8/1970 Pierre-Henri ........... B29C 49/58
53/140
3,605,791 A 9/1971 Troadec
(Continued)

FOREIGN PATENT DOCUMENTS

AT 280823 B 4/1970
EP 0073596 A1 3/1983
(Continued)

OTHER PUBLICATIONS

Extended European Search Report issued in corresponding EP Application No. 22188963.7, dated Dec. 5, 2022, pp. 1-8.

*Primary Examiner* — Alan B Waits
(74) *Attorney, Agent, or Firm* — Ruggiero McAllister & McMahon LLC

(57) ABSTRACT

A linear guide mechanism includes a housing having an inside housing surface that defines a bore extending through the housing coaxial with a longitudinal axis. A shaft is disposed at least partially in the bore and is reciprocatably and linearly moveable in the bore along the longitudinal axis. The shaft has an exterior shaft surface. A self-lubricating liner is disposed in the bore between the inside housing surface and the exterior shaft surface. The self-lubricating liner has an inside liner surface that is in sliding engagement with the exterior shaft surface of the shaft. The self-lubricating liner has an exterior liner surface.

20 Claims, 7 Drawing Sheets

(51) Int. Cl.
*F16C 33/08* (2006.01)
*F16C 33/20* (2006.01)
*F16C 33/28* (2006.01)
*B33Y 80/00* (2015.01)

(56) References Cited

U.S. PATENT DOCUMENTS

| | | | | |
|---|---|---|---|---|
| 5,129,739 | A | * | 7/1992 | Asai ................. F16C 33/201 |
| | | | | 384/909 |
| 5,417,499 | A | * | 5/1995 | Jacques ............... F16C 33/20 |
| | | | | 384/298 |
| 6,106,936 | A | | 8/2000 | Adam |
| 6,464,396 | B1 | * | 10/2002 | Schubert ........... F16C 33/208 |
| | | | | 384/298 |
| 8,650,756 | B2 | * | 2/2014 | Wadley ............... B21D 47/00 |
| | | | | 29/897 |
| 8,727,622 | B2 | | 5/2014 | Kurata et al. |
| 11,261,914 | B2 | | 3/2022 | Kurosaki et al. |

| | | | |
|---|---|---|---|
| 2005/0191001 | A1 | 9/2005 | Fidziukiewcz |
| 2006/0054438 | A1* | 3/2006 | Asaba ................... F16F 9/3207 |
| | | | 188/322.19 |
| 2012/0178327 | A1* | 7/2012 | Ogoe .................... F16C 33/201 |
| | | | 442/172 |
| 2015/0204383 | A1* | 7/2015 | Ishii ....................... F16H 25/24 |
| | | | 264/267 |
| 2017/0184086 | A1* | 6/2017 | Scancarello ........ F04C 18/0215 |
| 2020/0240470 | A1 | 7/2020 | Sorgenti et al. |
| 2020/0391988 | A1 | 12/2020 | Siemens |
| 2020/0392993 | A1* | 12/2020 | Kurosaki ................ F16C 17/02 |

FOREIGN PATENT DOCUMENTS

| | | |
|---|---|---|
| EP | 3026276 A1 | 6/2016 |
| EP | 3403744 A1 | 11/2018 |
| EP | 3141774 B1 | 8/2021 |
| EP | 3594515 B1 | 8/2021 |
| WO | 2005073574 A1 | 8/2005 |
| WO | 2019137646 A1 | 7/2019 |

* cited by examiner

SELF LUBRICATING LINEAR GUIDE BUSHINGS FOR RECIPROCATING CANNING AND BOTTLING MACHINERY

CROSS REFERENCE TO RELATED APPLICATION

This application claims the priority benefit of U.S. Provisional Patent Application Ser. No. 63/232,462, filed on Aug. 12, 2021, the entirety of which is incorporated herein by reference.

TECHNICAL FIELD

The present disclosure relates generally to a linear guide mechanism for a reciprocating container forming apparatus, and more particularly, to a self-lubricating linear guide bushing for reciprocating canning and bottling machinery.

BACKGROUND

Canning and bottling machinery in the food and beverage industry utilize a rotating carousel that includes multiple housings secured thereto, each of which has a ram (e.g., shaft) with one or more cam-followers attached thereto. The carousel, the housings and the cam-followers rotate around a stationary cam that engages each of the cam-followers. The rotation of the carousel causes the cam-followers to transmit the rotary motion into linear sliding rams. These rams move at high speed and perform various forming functions on aluminum, tin, plastic, composites, polymers, or steel. The guide bushings are in place to guide each ram through its stroke and to keep the ram concentric with the housing. Such operation involves high friction between the ram and housing, which generates heat, wear, or slop. Some bushings according the conventional art wear 3.175 millimeters (i.e., mm) or 0.125 inches or more in a six-month period and need to be replaced due to loss of concentricity with the shaft. Rams according to the conventional art rely on greased bronze for reducing friction and wear. However, the greases can contaminate the containers that the food or beverages are contained in. Additionally, bronze bushings are relatively heavy and require significant power dissipation of the machinery in use. Typically, alternatives to bronze bushings cannot withstand high-speed sliding interfaces and high temperatures generated by the sliding. The high-speed sliding can lead to overheating and premature failure of bushings.

Thus, there is a need for an improved linear guide bushing that overcomes the foregoing problems.

SUMMARY

According to aspects illustrated herein, there is a linear guide mechanism for a reciprocating container forming apparatus. The linear guide mechanism includes a housing having an inside housing surface that defines a bore extending through the housing coaxial with a longitudinal axis. A shaft is disposed at least partially in the bore and is reciprocatably (i.e., back and forth oscillatory motion) and linearly moveable in the bore along the longitudinal axis. The shaft has an exterior shaft surface. A self-lubricating liner is disposed in the bore between the inside housing surface and the exterior shaft surface. The self-lubricating liner has an inside liner surface that is in sliding engagement with the exterior shaft surface of the shaft. The self-lubricating liner has an exterior liner surface.

In some embodiments, the self-lubricating liner is adhered to the inside housing surface. In some embodiments, the linear guide mechanism further includes a bushing disposed in the bore. In some embodiments, the bushing has an exterior bushing surface and an inside bushing surface. In some embodiments, the exterior bushing surface is secured to the inside housing surface. In some embodiments, the exterior liner surface is secured to the inside bushing surface. In some embodiments, the self-lubricating liner has an annular configuration. In some embodiments, the bushing has an annular configuration. In some embodiments, the self-lubricating liner has a dynamic coefficient of friction of 0.02 to 0.06 when contact pressure between the inside liner surface and the exterior shaft surface is less than 13.79 megapascal (i.e., MPa) or 2 ksi (i.e., kilopounds per square inch) and a relative speed between the inside liner surface and the exterior shaft surface are up to 765 to 2540 mm per second or 30 to 100 inches per second. In some embodiments, the self-lubricating liner is configured to withstand temperatures of up to 93.33 to 148.89 degrees Celsius or 200 to 300 degrees Fahrenheit.

In some embodiments, the self-lubricating liner includes polytetrafluoroethylene mono-filament fibers interwoven with support fibers encapsulated in a resin. In some embodiments, the support fibers are selected from the group consisting of fiberglass, Dacron®, polyester, cotton, Nomex®, Kevlar® and combinations thereof. In some embodiments, the resin is selected from the group consisting of polyester, epoxy, phenolic, urethane, polyimide, polyamide, acrylics, cyanoacrylates, silicones, polysulfides, anaerobics, and elastomeric adhesives. In some embodiments, the self-lubricating liner has a predetermined axial length configured to maintain the contact pressure between the inside liner surface and the exterior shaft surface at less than 13.7895 MPa or 2 ksi.

In some embodiments, the linear guide mechanism further includes another self-lubricating liner spaced apart from the self-lubricating liner. In some embodiments, the linear guide mechanism further includes another bushing spaced apart from the bushing. In some embodiments, the bushing includes at least one of an aluminum alloy, a titanium alloy, a bronze alloy, a beryllium alloy, and a magnesium alloy. In some embodiments, the bushing includes a lattice or honeycomb structure. In some embodiments, the lattice or honeycomb structure is manufactured by a three-dimensional (3D) printing process. In some embodiments, the bushing includes a groove extending axially along the inside bushing surface and radially outward towards the exterior bushing surface. In some embodiments, the groove radially terminates between the inside bushing surface and the exterior bushing surface. In some embodiments, the groove extends into the self-lubricating liner. In some embodiments, the groove is configured to receive an anti-rotation device. In some embodiments, the groove is configured to convey a coolant medium. In some embodiments, the self-lubricating liner is configured to sustain wear of less than 0.1778 mm or .0070 inches after continuous linear sliding operation of the shaft in the self-lubricating liner for one year.

Any of the foregoing embodiments may be combined.

BRIEF DESCRIPTION OF THE DRAWING

Referring now to the Figures, which are exemplary embodiments, and wherein the like elements are numbered alike.

DETAILED DESCRIPTION

Figure 1:
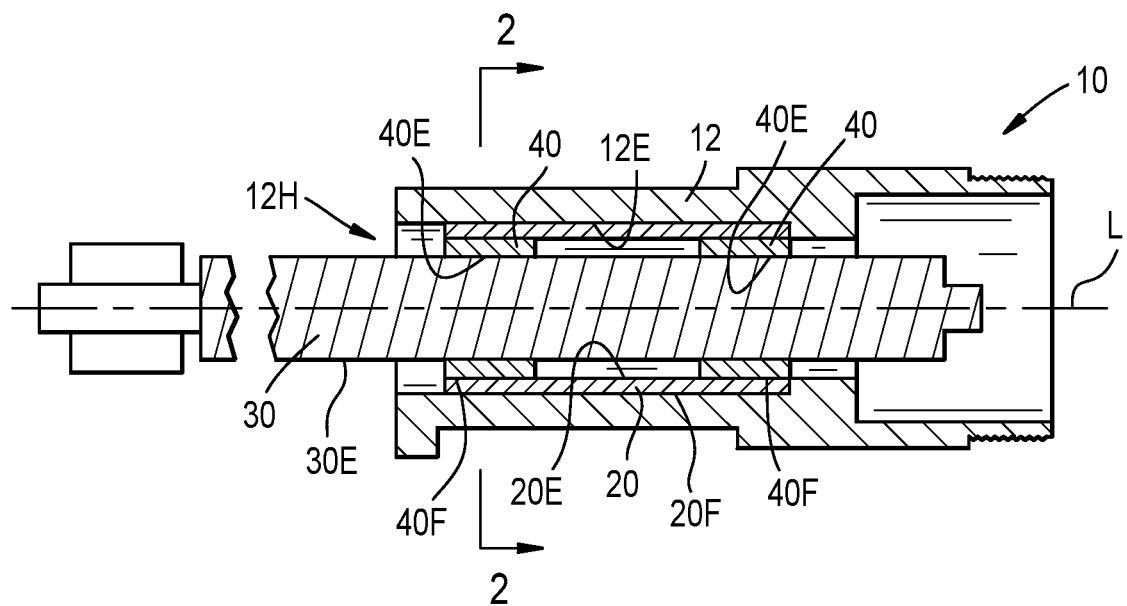
FIG. 1 is a cross-sectional view of a linear guide mechanism with one bushing and two liners, according to an embodiment of the present invention.
Figure 2:
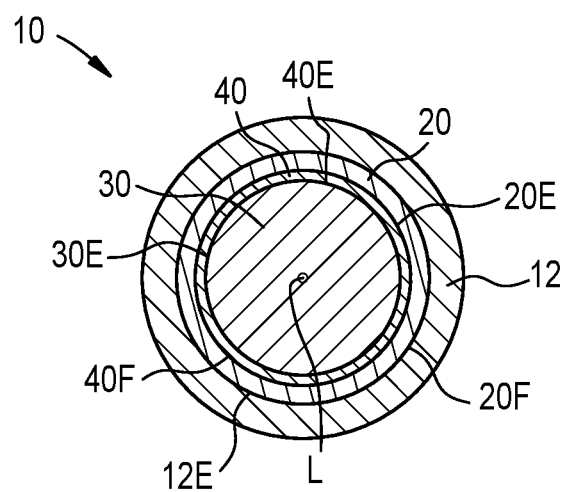
FIG. 2 is a cross-sectional view of the linear guide mechanism of FIG. 1 taken across Section 2-2.
Figure 3A:
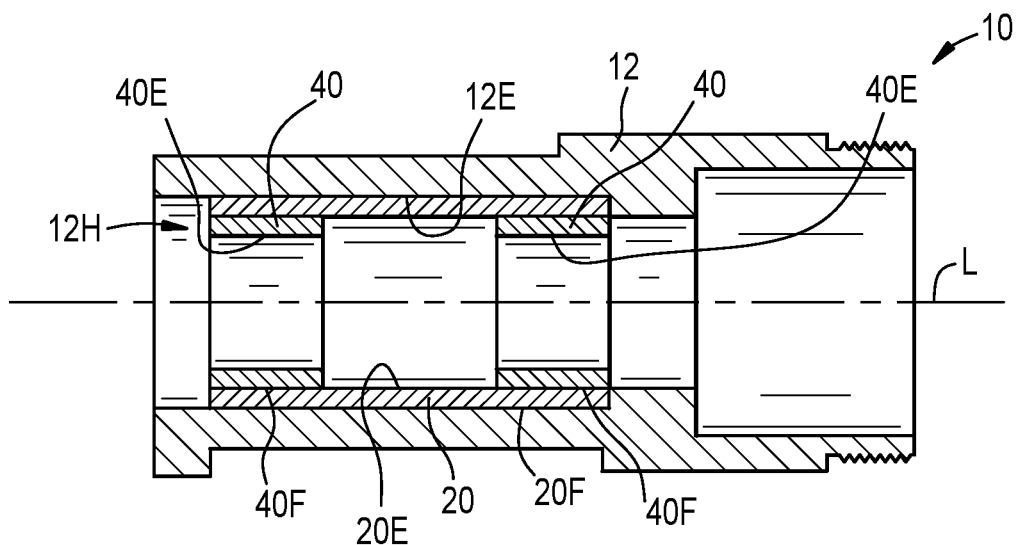
FIG. 3A is a cross-sectional view of the linear guide mechanism of FIG. 1 shown with the shaft removed.
Figure 3B:
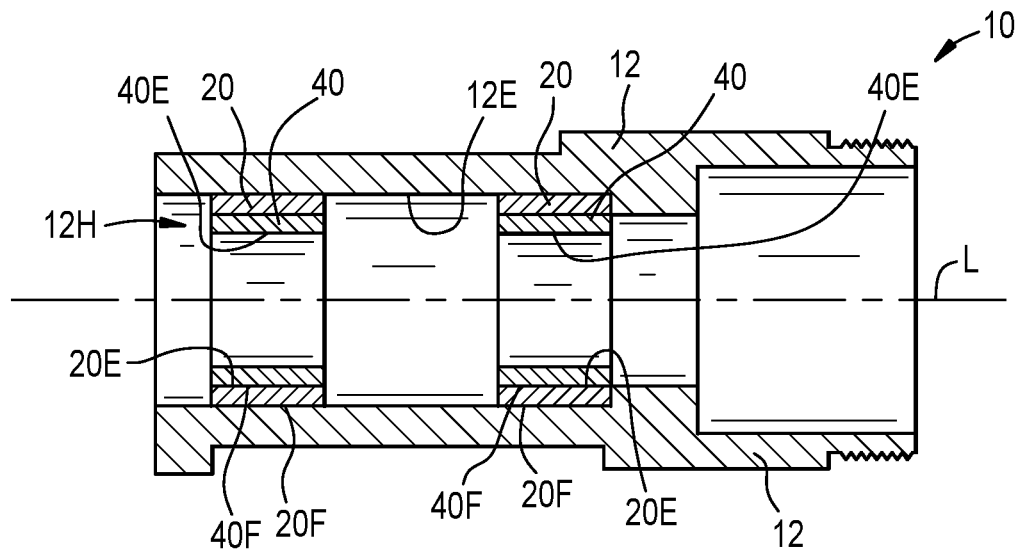
FIG. 3B is a cross-sectional view of the linear guide mechanism of FIG. 1 shown with the shaft removed and with two bushings.

As shown in FIGS. 1-3A, a linear guide mechanism 10 for a reciprocating container forming apparatus is provided. The linear guide mechanism 10 includes a housing 12 having an inside housing surface 12E that defines a bore 12H extending through the housing 12 coaxial with a longitudinal axis L. In some embodiments, as shown in FIGS. 1-2, a shaft 30 is disposed at least partially inside the bore 12H and is reciprocatably (i.e., back and forth oscillatory motion) and linearly moveable in the bore 12H along the longitudinal axis L. The shaft 30 has an exterior shaft surface 30E.

Two self-lubricating liners 40, each having an annular configuration, are disposed in the bore 12H between the inside housing surface 12E and the exterior shaft surface 30E. The self-lubricating liners 40 are spaced apart from each other. Each self-lubricating liner 40 has an inside liner surface 40E that is in sliding engagement with the exterior shaft surface 30E of the shaft 30. Each self-lubricating liner 40 has an exterior liner surface 40F. In other embodiments, there are more than two self-lubricating liners 40.

The linear guide mechanism 10 further includes a bushing 20, which has an annular configuration and is disposed in the bore 12H. The bushing 20 has an exterior bushing surface 20F and an inside bushing surface 20E. The exterior bushing surface 20F is secured to the inside housing surface 12E. The exterior liner surface 40F is secured to the inside bushing surface 20E. In some embodiments, the bushing 20 is press fit into the housing 12. In some embodiments, each axial end of the bushing 20 is axially aligned with an axial end of a respective self-lubricating liner 40. In some embodiments, the self-lubricating liners 40 are disposed entirely inside the bushing 20. The position of the self-lubricating liners 40 as shown in FIGS. 1-3A is advantageous for maintaining functional stiffness of the bushing 20 for alignment and positional tolerance, while serving to reduce the frictional drag on the shaft 30. The surface area of the inside liner surface 40E influences the contact pressures experienced by the self-lubricating liners 40.

In some embodiments, several smaller bushings 20 are installed instead of one large bushing 20, e.g., to control the contact area of the self-lubricating liners 40 or to reduced system weight. For example, referring to the embodiment of FIG. 3B, the linear guide mechanism 10 includes two bushings 20 spaced apart from one another. In some embodiments, the bushings 20 and the self-lubricating liners 40 are of the same length. In some embodiments, one of the bushings 20 is axially aligned with one of the self-lubricating liners 40, and the other bushing 20 is axially aligned with the other self-lubricating liner 40. In other embodiments, more than two bushings 20 spaced apart from one another are used.

Figure 4:
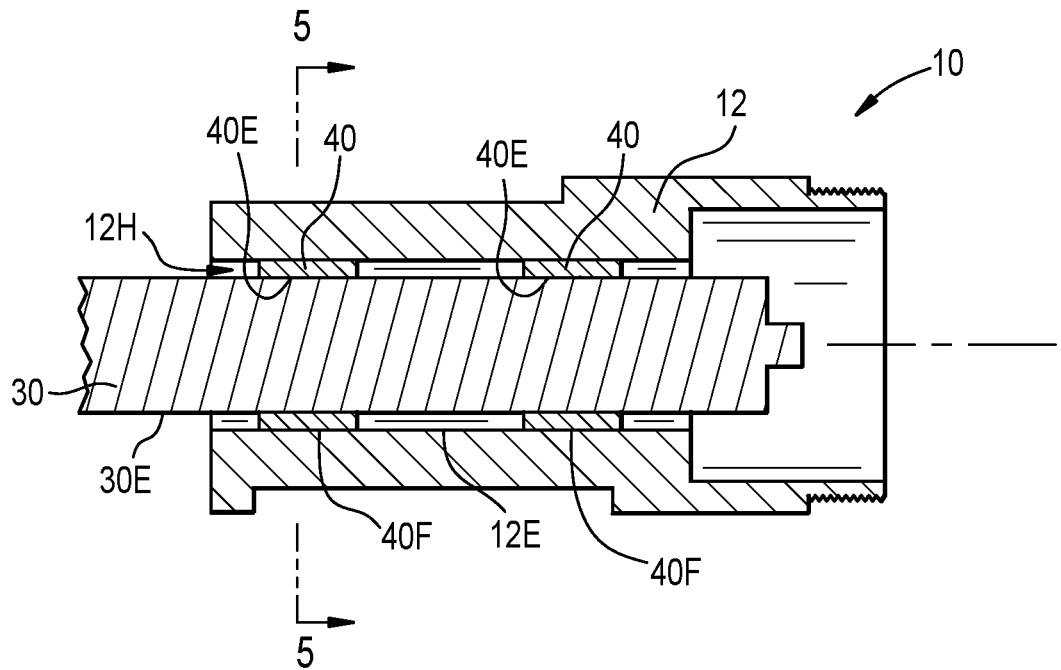
FIG. 4 is a cross-sectional view of the linear guide mechanism according to another embodiment of the present invention.
Figure 5:
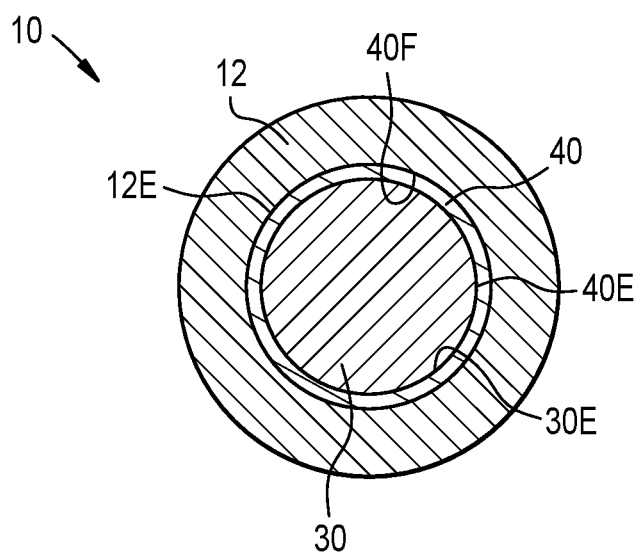
FIG. 5 is a cross-sectional view of the linear guide mechanism of FIG. 4 take across Section 5-5.
Figure 6:
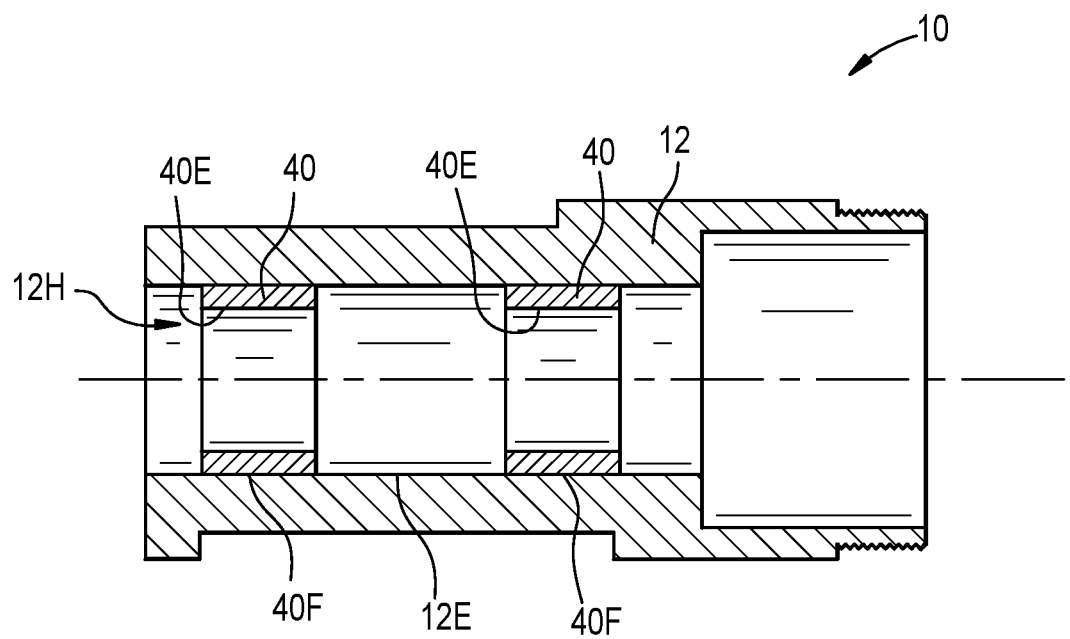
FIG. 6 is a cross-sectional view of the linear guide mechanism of FIG. 4 shown with the shaft removed.

Some embodiments of the linear guide mechanism 10 lacks the bushing 20. For example, in FIGS. 4-6, there is no bushing 20. Instead, the self-lubricating liner 40 is adhered directly to the inside housing surface 12E.

Figure 7:
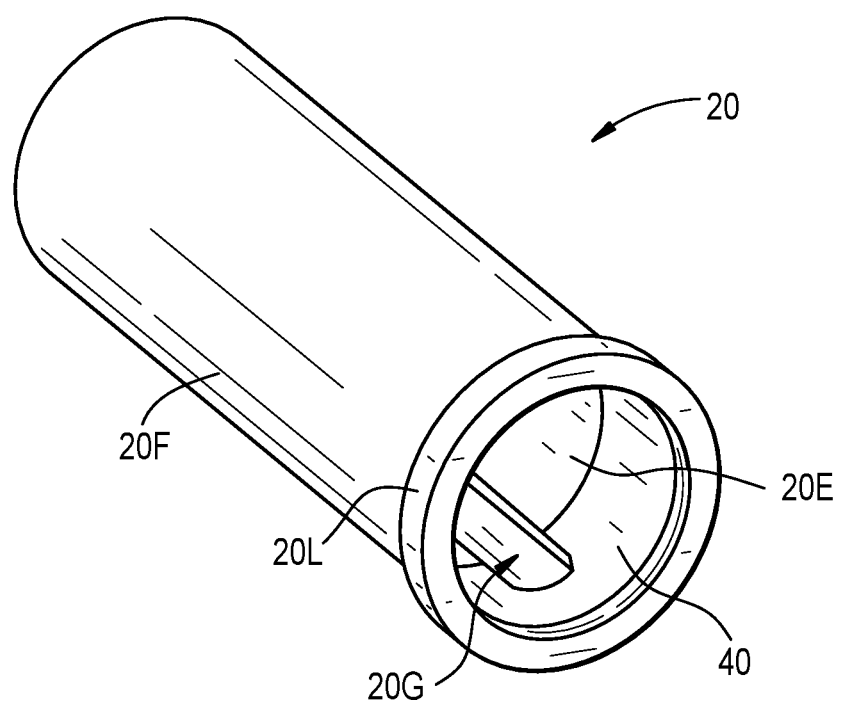
FIG. 7 is a perspective view of the bushing of FIG. 1 shown with a groove therein.
Figure 8:
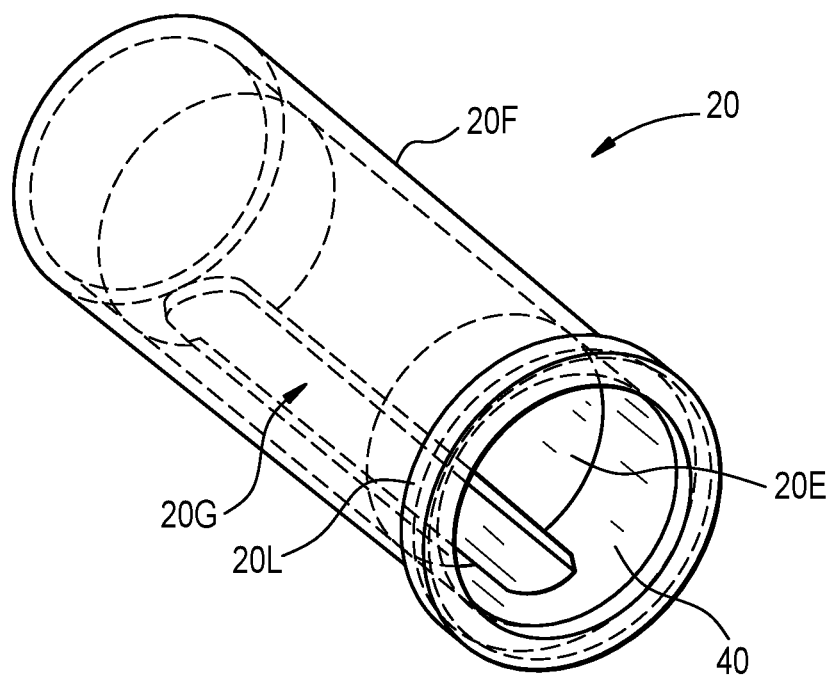
FIG. 8 is a phantom view of the bushing of FIG. 7.

As shown in FIGS. 7-8, in some embodiments, the bushing 20 has a groove 20G extending axially along the inside bushing surface 20E and radially outward towards the exterior bushing surface 20F. The groove 20G radially terminates between the inside bushing surface 20E and the exterior bushing surface 20F. In some embodiments, the groove 20G has rounded ends. In some embodiments, the groove 20G extends into the self-lubricating liner 40. In some embodiments, the groove 20G is configured to receive an anti-rotation device. For example, in some embodiments, the groove 20G is a keyway used for an anti-rotation device to keep the shaft 30 from rotating in the housing 12. In some embodiments, the groove 20G is configured to convey a fluid such as a coolant medium or lubricant. In some embodiments, the bushing 20 also has a lip 20L for receiving or compressing a seal.

Figure 9:
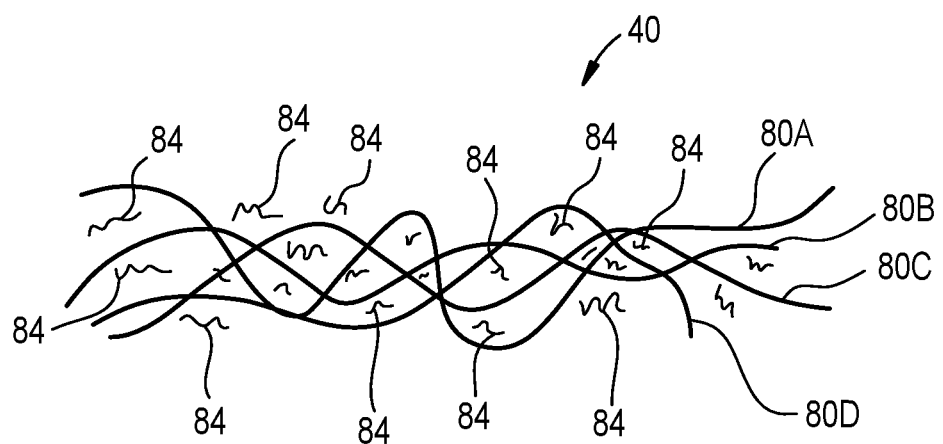
FIG. 9 is a schematic view of a cross-section of the self-lubricating liner.

The self-lubricating liner 40 is able to withstand heat generated from loading and movement conditions. Referring to FIG. 9, in some embodiments, the self-lubricating liner 40 includes polytetrafluoroethylene mono-filament fibers 80A, 80B interwoven with support fibers 80C, 80D encapsulated in a resin 84. In some embodiments, the polytetrafluoroethylene mono-filament fibers 80A, 80B include micro, nano, etched, or Torey® flock fibers cut at 0.1 mm-6 mm lengths. In some embodiments, the support fibers 80C, 80D include fiberglass, Dacron®, polyester, cotton, Nomex®, Kevlar®, or combinations thereof. In some embodiments, the resin 84 includes polyester, epoxy, phenolic, urethane, polyimide, polyamide, acrylics, cyanoacrylates, silicones, polysulfides, anaerobics, elastomeric adhesives, or other suitable resins. In some embodiments, the self-lubricating liner 40 includes additives for enhancing composite performance.

In some embodiments, the self-lubricating liner 40 has a predetermined axial length configured to maintain contact pressure between the inside liner surface 40E and the exterior shaft surface 30E at less than 13.79 MPA or 2 ksi. In some embodiments, the self-lubricating liner 40 has a radial thickness of 0.254-1.016 mm or 0.010-0.040 inches in the original as installed state, before operation. In some embodiments, the self-lubricating liner 40 has a dynamic coefficient of friction of 0.02 to 0.06 when contact pressure between the inside liner surface 40E and the exterior shaft surface 30E is less than 13.79 MPA or 2 ksi and a relative speed between the inside liner surface 40E and the exterior shaft surface 30E is 765 to 2540mm per second or 30 to 100 inches per second. In some embodiments, the self-lubricating liner 40 is configured to withstand temperatures of up to 93.33 to 148.89 degrees Celsius or 200 to 300 degrees Fahrenheit. In some embodiments, the self-lubricating liner 40 is capable of maintaining concentricity tolerances of the shaft 30 relative to the self-lubricating liner 40. Specifically, in some embodiments, the self-lubricating liner 40 wears less than seven thousandths of 25.4 mm or 1 inch in one year of continuous linear sliding operation of the shaft 30 within the self-lubricating liner 40. Here, 0.1778 mm or 0070 inches represents about 50-80 percent of the original thickness of the liner 40.

In some embodiments, the bushing 20 includes at least one of an aluminum alloy, a titanium alloy, a bronze alloy, a beryllium alloy, and a magnesium alloy. In some embodiments, the bushing 20 includes a lattice or honeycomb structure. In some embodiments, the lattice or honeycomb structure is manufactured by a 3D printing process. In some embodiments, the bushing 20 is lightweight to help minimize the weight of the linear guide mechanism 10. Minimizing the weight reduces the power needed to run the machine having the linear guide mechanism 10. In some embodiments, minimization of the weight of the linear guide mechanism 10 is achieved by: using lightweight materials such as aluminum or titanium that without the self-lubricating liner 40 would have undesirable friction and wear performance; incorporating weight reduced geometries such as honeycomb 3D printed materials that would otherwise not be appropriate for a sliding bushing; or integrating the bushing 20 and the housing 12 into a single component in which the self-lubricating liner 40 is applied directly to the housing 12 to reduce potential tolerance stack-up.

Figure 10:
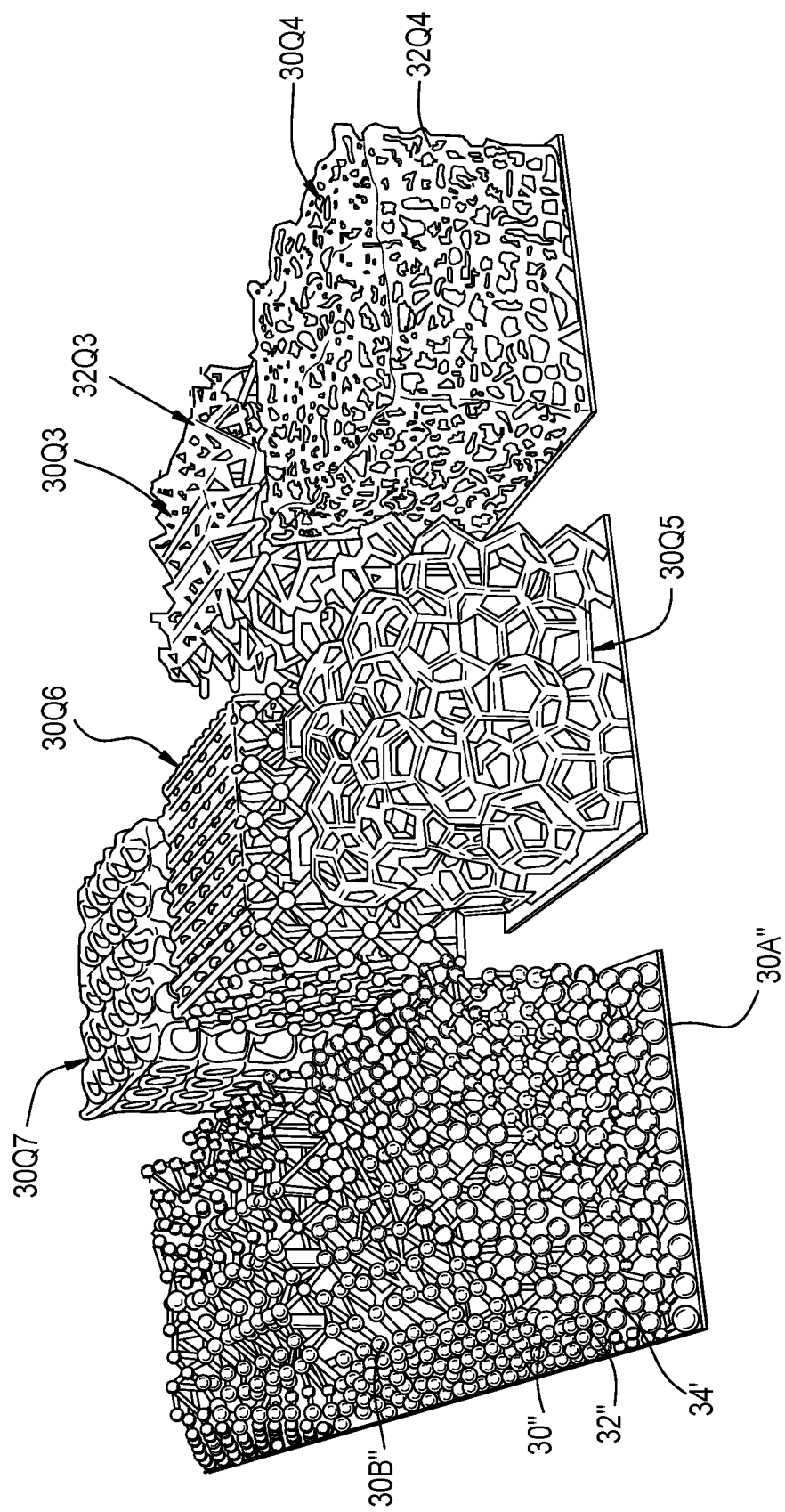
FIG. 10 is an illustration of various lattice structures suitable for making up the bushing.

FIG. 10 shows various examples of lattice structures suitable for making up the bushing 20. In one example, a lattice structure 30" has support members 32". The distribution of the support members 32" is such that there is a higher concentration of the support members 32" at a first end 30A" than at a second end 30B". That is, the spaces 34' between the support members 32" increase in volume moving from the first end 30A" to the second end 30B". In the same manner, in some embodiments, the distribution of support members 32" making up the bushing 20 is such that there is a higher concentration of the support members 32" at locations in the bushing 20 where stress is likely to be high. For example, in some embodiments, there is a relatively high concentration of the support members 32" in the bushing 20 proximate the interface between the bushing 20 and the self-lubricating liner 40.

In another example shown in FIG. 10, lattice structure 30Q3 is made up of randomly arranged or pseudo-randomly arranged support members 32Q3. Similarly, in yet another example, lattice structure 30Q4 is made up of randomly arranged or pseudo-randomly arranged support members 32Q4. Other examples of lattice structures include lattice structure 30Q5, lattice structure 30Q6, and lattice structure 30Q7. In various embodiments, the bushing 20 is made up of any one or any combination of any two or more of lattice structure 30", lattice structure 30Q3, lattice structure 30Q4, lattice structure 30Q5, lattice structure 30Q6, and lattice structure 30Q7.

The linear guide mechanism 10 according to the present disclosure has the advantage of providing for a grease free assembly, which helps to reduce grease related issues like contamination adhesion or food contamination. The linear guide mechanism 10 according to the present disclosure is capable of withstanding speeds and heat generated in sustained canning and bottling operations.

While the present disclosure has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A linear guide mechanism for a reciprocating container forming apparatus, the linear guide mechanism comprising:
   a housing having an inside housing surface that defines a bore extending through the housing coaxial with a longitudinal axis;
   a shaft disposed at least partially in the bore and being reciprocatably and linearly moveable in the bore along the longitudinal axis, the shaft having an exterior shaft surface;
   a bushing disposed in the bore, the bushing having an exterior bushing surface and an inside bushing surface, the exterior bushing surface being secured to the inside housing surface; and
   two self-lubricating liners each having an inside liner surface that is in sliding engagement with the exterior shaft surface of the shaft and an exterior liner surface that is secured to the inside bushing surface such that the two self-lubricating liners are spaced apart from one another by the bushing.

2. The linear guide mechanism of claim 1, wherein the two self-lubricating liners have an annular configuration.

3. The linear guide mechanism of claim 1, wherein the bushing has an annular configuration.

4. The linear guide mechanism of claim 1, wherein the two self-lubricating liners are configured to withstand temperatures of up to 148.89 degrees Celsius.

5. The linear guide mechanism of claim 1, wherein the two self-lubricating liners comprise polytetrafluoroethylene mono-filament fibers interwoven with support fibers encapsulated in a resin.

6. The linear guide mechanism of claim 5, wherein the support fibers are selected from the group consisting of fiberglass, polyester, cotton, and combinations thereof.

7. The linear guide mechanism of claim 5, wherein the resin is selected from the group consisting of polyester, epoxy, phenolic, urethane, polyimide, polyamide, acrylics, cyanoacrylates, silicones, polysulfides, anaerobics, and elastomeric adhesives.

8. The linear guide mechanism of claim 1, wherein the bushing comprises at least one of an aluminum alloy, a titanium alloy, a bronze alloy, a beryllium alloy, and a magnesium alloy.

9. The linear guide mechanism of claim 1, wherein the bushing comprises a lattice or honeycomb structure.

10. The linear guide mechanism of claim 9, wherein the lattice or honeycomb structure is manufactured by a 3D printing process.

11. A linear guide mechanism for a reciprocating container forming apparatus, the linear guide mechanism comprising:
    a housing having an inside housing surface that defines a bore extending through the housing coaxial with a longitudinal axis;
    a shaft disposed at least partially in the bore and being reciprocatably and linearly moveable in the bore along the longitudinal axis, the shaft having an exterior shaft surface;
    a self-lubricating liner disposed in the bore between the inside housing surface and the exterior shaft surface, the self-lubricating liner having an inside liner surface that is in sliding engagement with the exterior shaft surface of the shaft and the self-lubricating liner having an exterior liner surface; and a bushing disposed in the bore, the bushing having an exterior bushing surface and an inside bushing surface, the exterior bushing surface being secured to the inside housing surface, wherein the exterior liner surface is secured to the inside bushing surface, wherein the bushing comprises a groove extending axially along the inside bushing surface and radially outward towards the exterior bushing surface, the groove radially terminating between the inside bushing surface and the exterior bushing surface.

12. The linear guide mechanism of claim 11, wherein the groove extends into the self-lubricating liner.

13. The linear guide mechanism of claim 11, wherein the groove is configured to receive an anti-rotation device.

14. The linear guide mechanism of claim 11, wherein the groove is configured to convey a fluid therein.

15. A linear guide mechanism for a reciprocating container forming apparatus, the linear guide mechanism comprising:

a housing having an inside housing surface that defines a bore extending through the housing coaxial with a longitudinal axis;

a shaft disposed at least partially in the bore and being reciprocatably and linearly moveable in the bore along the longitudinal axis, the shaft having an exterior shaft surface;

two bushings disposed in the bore, each of the two bushings having an exterior bushing surface secured to the inside housing surface such that the two bushings are spaced from one another, and each of the two bushings having an inside bushing surface; and a self-lubricating liner disposed in each of the two bushings, each self-lubricating liner having an inside liner surface that is in sliding engagement with the exterior shaft surface of the shaft and an exterior liner surface that is secured to the inside bushing surface of one of the two bushings, wherein the two bushings each comprise a groove extending axially along the inside bushing surface and radially outward towards the exterior bushing surface, the groove radially terminating between the inside bushing surface and the exterior bushing surface.

16. The linear guide mechanism of claim 15, wherein the self-lubricating liner and/or the two bushings have an annular configuration.

17. The linear guide mechanism of claim 15, wherein the self-lubricating liner comprises polytetrafluoroethylene mono-filament fibers interwoven with support fibers encapsulated in a resin.

18. The linear guide mechanism of claim 15, wherein the support fibers are selected from the group consisting of fiberglass, polyester, cotton, and combinations thereof, and/or wherein the resin is selected from the group consisting of polyester, epoxy, phenolic, urethane, polyimide, polyamide, acrylics, cyanoacrylates, silicones, polysulfides, anaerobics, and elastomeric adhesives.

19. The linear guide mechanism of claim 15, wherein the two bushing comprise at least one of an aluminum alloy, a titanium alloy, a bronze alloy, a beryllium alloy, and a magnesium alloy.

20. The linear guide mechanism of claim 15, wherein the two bushings comprise a lattice or honeycomb structure.

* * * * *